United States Patent
Li

[15] 3,650,091
[45] *Mar. 21, 1972

[54] LIQUID MEMBRANE FOAM DIFFUSION

[72] Inventor: Norman N. Li, Edison, N.J.

[73] Assignee: Esso Research and Engineering Company

[ * ] Notice: The portion of the term of this patent subsequent to Nov. 12, 1985, has been disclaimed.

[22] Filed: Apr. 22, 1969

[21] Appl. No.: 818,336

Related U.S. Application Data

[63] Continuation-in-part of Ser. No. 552,198, May 22, 1966, Pat. No. 3,454,489.

[52] U.S. Cl. ................................................. 55/83
[51] Int. Cl. ........................................... B01d 57/80
[58] Field of Search ..................... 55/16, 83, 158; 208/308

[56] References Cited

UNITED STATES PATENTS

| | | | |
|---|---|---|---|
| 3,241,293 | 3/1966 | Pfefferle | 55/16 |
| 3,335,545 | 8/1967 | Robb et al. | 55/158 |
| 3,410,794 | 11/1968 | Li | 208/308 |

*Primary Examiner*—Reuben Friedman
*Assistant Examiner*—Charles N. Hart
*Attorney*—Chasan and Sinnock and Michael Conner

[57] ABSTRACT

A gaseous mixture is passed through a layer of liquid surfactant membrane; gradually, a foam of bubbles is generated. The bubbles are coated with liquid membrane and have an interior of the gaseous mixture. Component(s) of the mixture permeate more rapidly through the membrane and pass into the foam. To remove the more rapidly permeating components an inert gas is passed through the foam; the inert gas entrains the more rapidly permeating components and serves to transport it out of the system.

14 Claims, 1 Drawing Figure

LIQUID MEMBRANE FOAM DIFFUSION

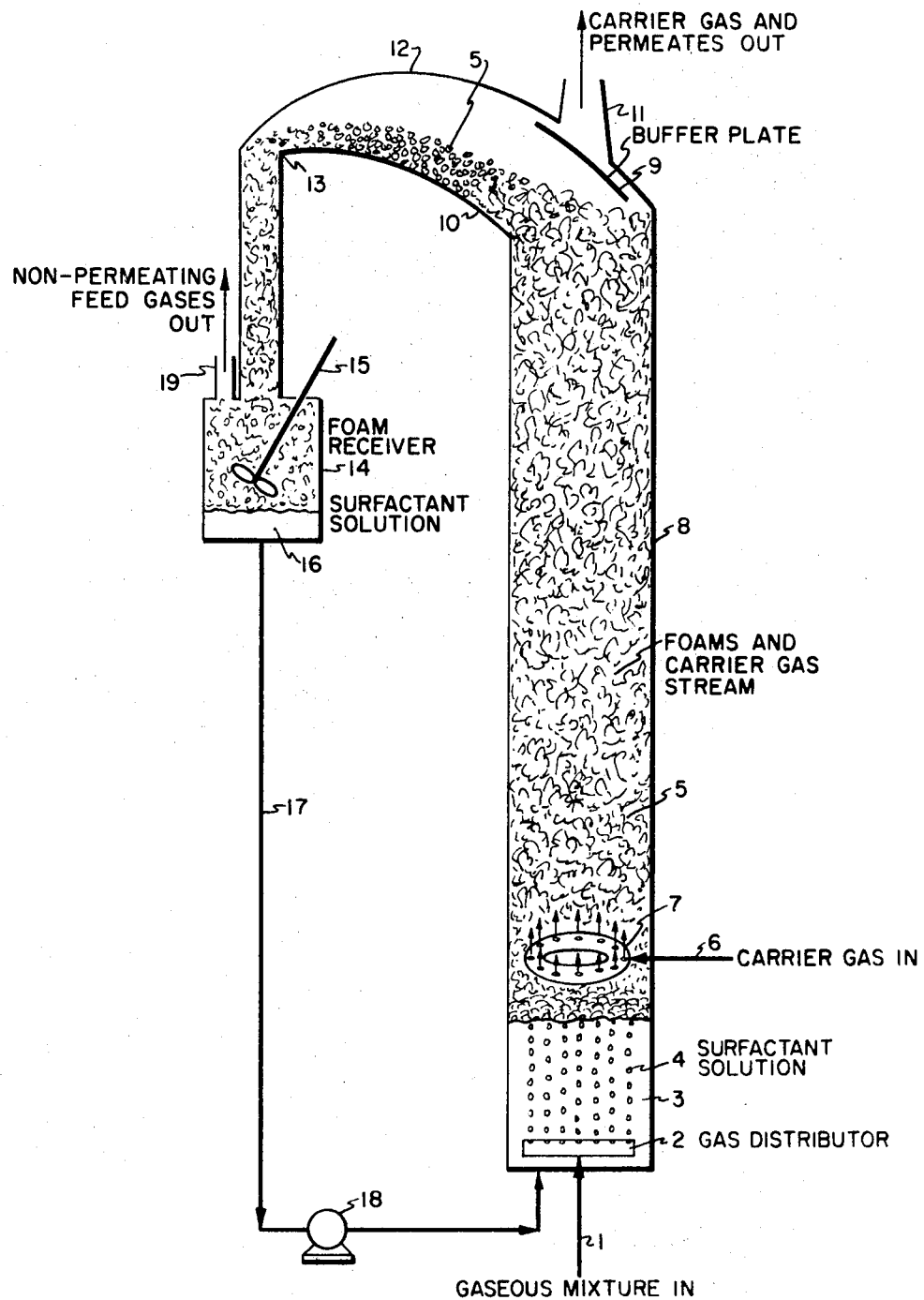
LIQUID MEMBRANE FOAM DIFFUSION
Norman N. Li   Inventor 3,650,091

LIQUID MEMBRANE FOAM DIFFUSION

CROSS REFERENCE TO RELATED APPLICATIONS

This application is a continuation-in-part of U.S. Ser. No. 552,198, filed on May 22, 1966, in the name of Normal N. Li, now issued, July 8, 1969, as U.S. Pat. No. 3,454,489.

FIELD OF THE INVENTION

This invention relates to the separation of gaseous mixtures by means of permeation through a liquid membrane. More specifically, this invention relates to an improved process for transporting the more rapidly permeating gas or gases away from the liquid membrane coated bubbles which are formed by passing the gas through a liquid surfactant membrane.

In order to separate a gaseous mixture by means of liquid membranes the gas must be introduced directly into the membrane solution so that bubbles containing the gaseous mixture will be formed, coated with a liquid membrane. The gases within the bubble permeate through the membrane at a different rate; during this period foam forms and gradually rises in the container or column wherein it is enclosed. The more permeable gas or gases is released into the void space within the foam and is difficult to separate. According to this invention, it has unexpectedly been discovered that the more rapidly permeating gas may be removed from the system by passing an inert carrier gas through the foam to transport the more permeable components of the mixture away from the foam.

PRIOR ART

The use of liquid membranes for the separation of mixtures such as an aqueous solution and an organic liquid mixture is a relatively recent development. Typical of the art in this area is U.S. Pat. No. 3,410,794 which disclosed the emulsification of a liquid mixture and the coating of the emulsified mixture with a liquid surfactant membrane. The more permeable component of the mixture will pass more rapidly through the membrane into a solvent phase and is eventually recovered. The less permeable phase is then recovered by breaking the emulsion.

In Ser. No. 552,198 liquid membranes are utilized to separate an aqueous solution such as sea water into its components.

Nowhere in these patents does one face the problem of separating the more permeable member of a gaseous mixture from a foam of liquid membrane bubbles, in which it is entrained.

SUMMARY OF THE INVENTION

According to this invention, it has unexpectedly been discovered that by passing an inert gas through a foam which is formed when a mixture of gases is passed through a liquid surfactant membrane one may effect the removal of the more permeable components of the mixture from the foam. The more permeable component of the mixture, along with the inert carrier gas is then removed from the system within which it is contained. Generally, the system will be a column, and it is preferably removed from the top of the column. The remaining gas and foam are then collapsed and the gas which is released from the bubbles is recovered enriched with the less permeable elements of the mixture.

The liquid membranes are formed from various liquid surfactants; mixtures which may be separated include any gaseous mixture whose components permeate at a different rate through the surfactant membrane. The separation is usually carried out at ambient temperature and ambient pressure.

More particularly, gaseous mixtures may be separated effectively by the process of the instant invention. These mixtures would include hydrocarbon mixtures such as a mixture of ethane and ethylene, inorganic gaseous mixtures such as a mixture of hydrogen and carbon dioxide, and gaseous mixtures composed of both organic and inorganic compounds such as a mixture of methane and carbon dioxide.

Organic gaseous mixtures including any combination of the following species: aromatics, normal paraffins, isoparaffins, olefins, naphthenes, oxygenated hydrocarbons (aldehyde, alcohol, etc.), or members of the same species. The components of a mixture may be either gases or vapors and may have a wide range of carbon numbers. For high degree of separation in one stage, the difference between the carbon numbers of the feed components should be large, such as a difference of 5, i.e., one compound having a carbon number of 1 and the other having a carbon number of 6. In general, if all the components in a feed are gases at ambient temperature and pressure, their carbon numbers are in a range from 1 to 4. This range will become larger when temperature is raised while the pressure is still kept at 1 atm. Thus, it is preferred to separate mixtures where the components have 1 to 4 carbon atoms in order to operate the process at ambient temperature and pressure. Interesting separations include the separation of isomers of $C_1$ to $C_4$ hydrocarbons, i.e., butene-1 from butene-2, butane from isobutane, etc., $C_1$ to $C_4$ olefins from paraffins, $C_6$ to $C_{20}$ aliphatics from $C_6$ to $C_{20}$ aromatics.

For inorganic mixtures, the feed components can also be gases as well as vapors at ambient temperature and pressure, the conditions at which this separation process normally will operate. Obviously, inorganics in general may be separated from one another, i.e., ammonia may be separated from nitrogen and hydrogen. For high degree of separation per stage, the difference between the molecular weights of the feed components, in general should be large i.e., at least 20. Organic compounds such as $C_1$ to $C_4$ hydrocarbons may be separated also from inorganic compounds, such as hydrogen, $NH_3$ etc.

The mixture is commingled with the liquid surfactant membrane, preferably by bubbling the gaseous mixture into the liquid surfactant. By surfactant it is meant those surface active agents which have hydrophobic and hydrophilic ends.

A wide variety of different surfactant groups may be utilized for the process of the instant invention. The various surfactant groups include anionic surfactants, cationic surfactants, nonionic surfactants, amphoteric surfactants and miscellaneous surfactants such as polymeric surfactants and fluorocarbon surfactants. All may be utilized in the process of the instant invention. Although for a given separation, one group may achieve greatly enhanced separation. The preferred grouping of surfactant to be utilized in the instant invention are the cationic surfactants and anionic surfactants since they are ionizable and the presence of a charge aids the instant invention.

Anionic and cationic surfactants both ionize in solution. Anionic surfactants ionize in solutions and produce a negative charge. By contrast, cationic surfactants ionize in solution and produce a positive charge. The general classification of nonionic surfactants refers to those surfactants which do not ionize in solution at all. The various amphoteric or ampholitic surfactants ionize in solution and produce either a positive or negative charge depending on the pH of the solution.

In this invention, water-soluble surfactants are used if the gaseous mixture to be separated contains mainly organic gases; and oil-soluble surfactants are used if the gaseous mixture contains mainly inorganic gases.

Anionic surfactants include a wide range of compounds. Perhaps the best known of which are the soaps which are water-soluble salts of long-chain carboxylic acids. The soaps usually contain 12 to 18 carbon atoms per molecule and may be prepared from saturated or unsaturated fatty acids. Generally, the soaps are salts of sodium, potassium or ammonia. Included among them are the aliphatic sulfonates which are represented by the general formula: $R \cdot SO_2 \cdot O^-, Na^+$ in which R may be a straight-chain or branched-chain paraffin chain, or a cyclo-aliphatic radical. An example of this group would be sodium tetradecane sulfonate. Additionally, the group includes sulfonates of aliphatic-aromatic hydrocarbons such as alkylated naphthylene, alkylated benzene, and aralkyl aromatics. The alkyl benzene sulfonate type of detergent has received wide use in industry. When utilizing benzene as the aromatic constituent of the surface active agent, it has been found that best results can be achieved if one of the alkyl groups is $C_{10}$ to $C_{14}$ in length. Other surface-active agents included in this general group are ester sulfonates such as sulfoester and sulfoacyl compounds, amide sulfonates such as sulfoamide and sulfoacyl amide compounds and sulfoamide sulfonates. Additionally, sulfonates containing ether, amino, keto and sulfone groups may be utilized.

The anionic surface-active agents also include the class of aliphatic sulfates which is characterized by the generic formula of $R(OSO_3^-, Na^+)_n$ wherein R contains one or more hydrophobic groups and n is at least one. Traditionally, R is a saturated or unsaturated aliphatic group, branched or with a straight chain usually containing 12 carbon atoms. Shorter chains may be utilized. The group contains sulfated fatty alcohols such as straight-chain, secondary tertiary and branched-chain fatty alcohol sulfates. Additionally, sulfated fatty condensation products, sulfated fatty glycerides, acids and esters as well as sulfonated oils may be used.

The general group of cationic surfactants includes amine salts as well as quaternary ammonium compounds. Salts of long-chain primary alkyl amines including octadecylamine and dodecylamine are effective surfactants in this group. However, the secondary, tertiary amine salts and quaternary ammonium salts are preferable. Amine salts having at least one alkyl group of $C_8$ to $C_{20}$ are effective surfactants.

The nonionic surfactants also represent a wide grouping. Included within this group are the sugar esters as exemplified by the fatty esters of glycol, sorbitol and mannitol. The fatty alcohol amides also fall within this category. Additionally, derivatives of ethylene oxide such as the Igepals are also nonionic surfactants. The Igepals are discussed in more detail below.

The final overall grouping can best be called miscellaneous and includes a broad category of macromolecules and polymers. Included within this group are the polyvinyl alcohols and derivatives thereof such as aldehydes derived from various polyvinyl alcohols. Polyvinyl esters are also effective as surface-active agents.

Since the number of surfactants is extremely large, it is not intended to burden this application with numerous examples. The following publications are herein incorporated by reference. Surface Chemistry by Lloyd I. Osipow, Reinhold Publishing Company, New York (1962), Chapter 8 and Surface Activity, Moilliet et al., Van Nostrand Company, Inc. (1961), Part III.

Typical surfactants that may be utilized with this invention include Igepal. This is a nonionic surfactant, nonylphenoxypolyethyleneoxy ethanol. It is a trademark of the General Aniline and Film Corporation and has the configuration $RC_6H_4O(CH_2CH_2O)_nCH_2CH_2OH$ where R may be $C_8H_{17}$, $C_9H_{19}$ or $C_{10}H_{21}$ and $n$ varies from 1.5 to 100. Other surfactants include polyvinyl alcohol, a surface-active macromolecule; trimethyldodecyl ammonium chloride, an effective cationic quaternary ammonium surfactant; sodium dodecyl sulfate, an effective surfactant of anionic aliphatic sulfate.

Saponin, another surface-active agent in the group of anionic surfactants, is better known as sapogeninglycoside. It is a type of glycoside which is widely distributed in plants. All saponins foam strongly when shaken with water. They form oil in water emulsions and act as protective colloids. Each saponin molecule consists of a sapogenin which constitutes the aglucon moiety of a molecule and a sugar. The sapogenin may be a stearoid or a triturpene and a sugar moiety may be glucose, galactose, pentose or a methyl pentose. Saponin has been hypothesized according to Hackh's Chemical Dictionary by Julius Grant, Third Edition, 1944 (McGraw-Hill Book Company, Inc.), as having a formula $C_{32}H_{54}O_{18}$ and a molecular weight of 726.5.

The gaseous mixture can be bubbled into the surfactant solution at any rate within a wide range. Basically the highest rate should be the rate above which violent splashing of the surfactant solution occurs, whereas the lowest rate may be dictated by the economical consideration. Normally, a moderate rate, such as 400–700 cc./min. may be utilized for a column of 6 feet height and 3 in diameter. A wide range of temperatures may be utilized in the process of the instant invention. Temperatures used in the separation process itself are not critical. There would, however, be a lower and an upper limit which would be satisfactory for separation with a liquid phase surfactant membrane. The lowest temperature should be higher than the freezing temperature of the liquid surfactant solution. It will also have to be higher than the condensation temperature of the gaseous mixture so that mass transfer will be facilitated.

In the event that nonionic surfactants are utilized, the highest temperature should be lower than the precipitation temperature of the surfactant. If an ionic surfactant is to be used, the highest temperature is restricted by the boiling point of the liquid surfactant solution. Thus, the temperature is to be regulated by the boiling point of the lowest boiling element in the separation. It would be preferred to use room temperature since there is no additional expense in obtaining this level.

Pressure is also not critical and the most desirable pressure would be ambient, i.e., one atmosphere.

The surfactant solution is maintained within a tower preferably but other vessels such as a mixer in which surfactants and water are first mixed to form a homogeneous solution from which liquid membranes can be produced may also be utilized. The advantage to the tower is for easy operation since the bubbles coated with a liquid membrane in the surfactant solution can directly ascend into the zone where they are in intimate contact with a carrier gas without any additional piping and blower device for its transport. The surfactant solution should, however, be maintained in a mixer if the emulsion technique described in U.S. Pat. No. 3,410,794 is utilized in this invention to get emulsion-size bubbles.

As the gas is bubbled into the surfactant, a foam begins to build and rise gradually in the column or tower. Naturally, the more permeable element or elements of the mixture will pass more rapidly through the surfactant membrane.

To remove this more permeable element or elements an inert gas is passed through the foam, preferably in a cocurrent direction; the inert gas serves as a carrier for the permeating element or elements of the mixture. By an inert gas it is meant that the gas cannot react with the feed gases and the surfactant solution under the process conditions. For example, permanent gases such as nitrogen, helium and air are inert gases for a wide range of separation systems. The inert gas can be passed through the foam at about the same velocity as that of the feed gas, but preferably at lower rate than that of the feed gas to get higher permeate concentrations.

After the permeating gas becomes entrained in the inert carrier gas the two are removed from the system. In a column it is preferred to remove them at the top. The remaining gas is entrapped within the liquid membrane; the foam created by liquid membrane bubbles is eventually collapsed preferably by agitation. Alternate methods for collapsing this foam can be used, such as heating, chilling, vibration, filtration, adding chemical foam-breaking agents, etc.

The carrier gas is preferably one from which the more permeable element or elements may readily be removed. The removal may be effected in several ways, such as by compression, by freezing or by selective permeation through a polymeric membrane unit.

The attached drawing is illustrative of a typical apparatus in which one may carry out the process of the instant invention.

There is, of course, no intention to be bound to the use of any specific apparatus.

Turning to the figure, a gaseous mixture comprising ethylene-methane in a ratio of 50 to 50 is passed in through line 1 and gas distributor 2 at a rate of 2000 cc./hr. Temperature and pressure were ambient. The gas passes into an aqueous surfactant solution 3 which contains sodium dodecyl sulfate as the membrane-forming surfactant at 0.2 percent by weight and glycerol as a thickening agent at 60 percent by weight. Bubbles designated as 4 form in surfactant solution 3; the outer surface of the bubble is the liquid membrane formed by the aqueous surfactant solution. The interior of the bubble is occupied by the mixture of gases.

These bubbles rise and form a foam designated as 5. Carrier gas is introduced into the system through line 6 and outlet 7. The carrier gas is nitrogen and is introduced at a velocity of 1000 cc./hr. The carrier gas passes through column 8 until it reaches upper region. Within the upper region is a plate 9; the function of this plate is to keep the foam from being carried out of the column by the outgoing carrier gas stream. The carrier gas exits through channel 11. Permeate is recovered from the carrier gas by means of compression, because the inert gas is comparatively more difficult to condense. Chilling may be used at the same time to facilitate condensing of the permeate gases. The carrier gas may then be recycled back through line 6 for further use in the process. Permeate which is removed with the carrier gas has the following composition: 84 percent of ethylene and 16 percent of methane.

The column 8 is bent at point 10 in order to aid in the separation of the carrier gas leaving through exit 11 and the foam 5. This is because a gas tends to flow upwardly and therefore the carrier gas stream can easily leave the column when the exit is on top of the column, whereas the foam, being stopped from going out with the carrier gas by the baffle plate 9, is easily pushed over the bend into the foam receiver 14 by the oncoming foam continuously produced at the gas inlet. The foam thus flows continuously into foam receiver 14. Within the foam receiver 14 mild agitation takes place by means of stirrer 15. This serves to collapse the gas bubbles in the foam. The recovered surfactant solution builds up at 16. Surfactant is removed from foam receiver 14 through line 17 and is recycled by means of pump 18 back into column 8. The non-permeating feed gases are removed through orifice 19; they comprise 42 wt. percent of ethylene and 58 wt. percent of methane.

SPECIFIC EMBODIMENTS

Example 1

In this example, the separation of butene-1 and butene-2, two olefins, was effected. An apparatus substantially identical to that of the figure was utilized. Column 8 was about 6 feet long and about 3 inches in width; it was composed of glass tubing. In the bottom section of the tower 250 cc. a surfactant solution which comprised an aqueous solution of 0.2 percent by weight Saponin and 70 percent glycerol by weight was used to form the liquid membrane layer. Temperature was maintained at 25° C. and pressure was 1 atm during Example 1. Gas was bubbled in through line 1 at a rate of 2100 cc./hr. Foam began to form in the lower region and passed upwardly in the tower. At a point about 0.5 foot from the bottom, carrier gas which was nitrogen was introduced at a velocity of 1000 cc./hr. The more permeable component of the mixture which was butene-2 passed into the carrier gas at a faster rate than the less permeable component. Carrier gas and permeate moved up the tower and then passed through exit 11 which was at the top of the tower at a height of 6 feet. The permeate was analyzed by means of gas chromatography and found to have a composition of 54.31 percent butene-1 and 45.69 percent butent-2. The original composition of the feedstream was 61.83 percent butene-1 and 38.17 percent butene-2. This result therefore indicates that butene-2 was the preferentially permeating compound. There was a curve in the top of the tower at 12 which was about 1 foot in length and at an angle of roughly 15°. The less permeable elements of the mixture and surfactant passed on down along the curve into foam receiver 14. While in foam receiver 14, agitation was provided by means of stirrer 15 which was an air stirrer, which revolved at a rate of 60 r.p.m. The raffinate feed gases were recovered through exit 19 and had a composition of 63.11 percent butene-1 and 36.89 percent butene-2, as determined by gas chromatography. Liquid surfactant was recovered from zone 16, passed through line 17 and recycled back into tower 8. The separation of butene-1 from butene-2 can be increased by staging. i.e., the raffinate feed gases can be sent to other stages in series for similar operation.

Example 2

In this example the exact conditions and apparatus of Example 1 were utilized except that the feed gas was a mixture of 46.14 wt. percent n-butane and 53.86 percent isobutane. At exit 11 the permeate and compressor gas were recovered again, as in Example 1 and the permeate analyzed in the manner of Example 1 by gas chromatography. The permeate contained 58.16 wt. percent of n-butane and 41.84 percent of isobutane. The non-permeating gas which was recovered at exit 19 contained 43.98 wt. percent of n-butane and 56.02 wt. percent of i-butane.

Example 3

In this example the exact conditions and apparatus of Example 1 were again utilized except that the feed mixture comprised 54.08 wt. percent of ethylene, an olefin and 45.92 wt. percent of ethane, a paraffin. The permeate recovered at orifice 11 comprised 61.47 wt. percent of ethylene and 38.53 wt. percent of ethane.

The nonpermeating feed gases recovered at orifice 19 comprised 52.71 wt. percent of ethylene and 47.19 wt. percent of ethane.

Example 4

In this example, the identical process conditions to Example 1 are utilized except that the feedstream comprises two inorganic compounds carbon dioxide and hydrogen and the surfactant solution is organic in nature. A solution of 250 cc. of 0.5 percent SPAN 80, which is a fatty acid ester of anhydro sorbitols, in toluene is used as the membrane-forming solution. The feed comprises about 20 wt. percent of carbon dioxide and about 80 wt. percent of hydrogen. At orifice 11 a permeate is recovered which comprises 77.9 wt. percent of carbon dioxide and 22.1 wt. percent of hydrogen. This is determined by the same method utilized in Example 1. At orifice 19 the less permeable mixture is recovered and it comprises 9.8 percent of carbon dioxide and 90.2 percent of hydrogen. Again, analysis is by the same technique as in Example 1.

This example indicates that inorganic compounds may effectively be separated by means of the process of the instant invention.

Example 5

In this example the exact conditions and apparatus of Example 1 are utilized except that the temperature is 60° C., and the feed mixture comprises 5 wt. percent of benzene and 95 wt. percent of methane. At orifice 11 a mixture is recovered which comprises 31 wt. percent of methane and 69 wt. percent of benzene indicating that benzene is the more permeable element in the mixture. At orifice 19, the non-permeating gas is covered and found to contain 0.6 wt. percent of benzene and 99.4 wt. percent of methane. Here we see that the instant process may be used to effectively separate aromatics from an aliphatic i.e., a paraffin.

Example 6

In this example the exact conditions and apparatus of Example 1 are utilized except that the feed mixture is about 50 wt. percent of methane and about 50 wt. percent of hydrogen. Carrier gas, surfactant, etc., are all identical. At orifice 11 a mixture is recovered which contains 5 wt. percent of methane and 95 wt. percent of hydrogen. Thus, indicating that hydrogen is the more permeable element. At orifice 19 the nonpermeating mixture is recovered and it contains 56 percent of methane and 44 percent of hydrogen.

What is claimed is:

1. A process for separating components of a gaseous mixture which comprises passing said mixture through a liquid surfactant solution whereby bubbles of said mixture are formed having a surfactant coating, said surfactant coating allowing at least one component of said mixture to permeate more rapidly than at least one other component, forming a froth comprised of said bubbles wherein at least a portion of said more rapidly permeating component passes through said surfactant coating, passing an inert carrier gas through said froth wherein said more rapidly permeating component is entrained in said inert carrier gas and separating said inert carrier gas and said entrained more rapidly permeating component.

2. The process of claim 1 wherein said mixture is hydrocarbon.

3. The process of claim 1 wherein said surfactant is cationic.

4. The process of claim 1 wherein the carrier gas after separation from the foam is compressed to separate the more permeable component from said carrier gas.

5. The process of claim 1 wherein said mixture comprises $C_1$ to $C_4$ paraffins and olefins.

6. The process of claim 1 wherein said mixture comprises inorganic compounds and hydrocarbons.

7. A process for separating components of a gaseous mixture which comprises passing said mixture through a liquid surfactant solution whereby bubbles of said mixture are formed having a surfactant coating, said surfactant coating allowing at least one component of said mixture to permeate more rapidly than at least one other component, forming a froth comprised of said bubbles wherein at least a portion of said permeating gas passes into said froth, passing an inert carrier gas through said froth wherein said permeable component is entrained in said inert carrier gas, separating said inert carrier gas and said entrained permeating gas from said froth, then collapsing said foam and recovering the less permeable component of said mixture.

8. The process of claim 7 wherein said inert gas is nitrogen.

9. The process of claim 7 wherein said mixture comprises two isomers.

10. The process of claim 7 wherein said inert gas is air.

11. The process of claim 7 wherein said mixture comprises normal and iso compounds.

12. The process of claim 7 wherein said mixture comprises $C_1$ to $C_4$ olefins and paraffins.

13. The process of claim 7 wherein said surfactant is anionic.

14. The process of claim 7 wherein said surfactant is cationic.

* * * * *